United States Patent
Forbes et al.

(10) Patent No.: US 7,440,727 B2
(45) Date of Patent: Oct. 21, 2008

(54) HANDLING TRANSFER OF MANAGEMENT DATA TO AND FROM A TELECOMMUNICATIONS UNIT OF A TELECOMMUNICATIONS SYSTEM

(75) Inventors: Nicolas J. D. Forbes, Berkshire (GB); Junior C. Powell, Kent (GB); Jeremy M. T. Rowe, Bucks (GB)

(73) Assignee: Airspan Networks, Inc., Boca Raton, FL (US)

( * ) Notice: Subject to any disclaimer, the term of this patent is extended or adjusted under 35 U.S.C. 154(b) by 662 days.

(21) Appl. No.: 11/039,353

(22) Filed: Jan. 20, 2005

(65) Prior Publication Data

US 2005/0186903 A1   Aug. 25, 2005

Related U.S. Application Data

(63) Continuation-in-part of application No. 10/993,858, filed on Nov. 19, 2004, now abandoned.

(30) Foreign Application Priority Data

Jan. 21, 2004   (GB) ................................. 0401278.7

(51) Int. Cl.
  *H04B 7/00*   (2006.01)
(52) U.S. Cl. .................... 455/41.1; 455/550.1
(58) Field of Classification Search .................. None
  See application file for complete search history.

(56) References Cited

U.S. PATENT DOCUMENTS

| 4,644,321 | A | | 2/1987 | Kennon |
| 4,697,183 | A | | 9/1987 | Jenning et al. |
| 5,568,516 | A | * | 10/1996 | Strohallen et al. ........... 455/41.1 |
| 6,150,955 | A | * | 11/2000 | Tracy et al. ............ 340/870.02 |
| 6,956,500 | B1 | * | 10/2005 | Ducharme et al. ..... 340/870.02 |

FOREIGN PATENT DOCUMENTS

| DE | 4114448 | | 11/1992 |
| DE | 4114448 | A1 | 11/1992 |
| DE | 4303507 | A1 | 8/1994 |
| GB | 2294378 | A | 4/1996 |
| GB | 2331666 | | 5/1999 |
| GB | 2331667 | A | 5/1999 |

* cited by examiner

*Primary Examiner*—Thanh C Le
(74) *Attorney, Agent, or Firm*—Haynes Beffel & Wolfeld LLP (57) ABSTRACT

A telecommunications unit (for example a subscriber terminal or a base station) is arranged to communicate over a wireless link with a further telecommunications unit of a telecommunications system in order to allow traffic data to be passed between the telecommunications unit and the further telecommunications unit. The telecommunications unit comprises a management processor operable to handle management data, and inductive loop logic coupled to the management processor and operable to allow management data to be passed between the management processor and a portable management unit via a separate wireless link between the inductive loop logic and external inductive loop logic associated with the portable management unit. This provides a particularly efficient technique for the transmission of management data between the telecommunications unit and the portable management unit, without the need for a physical contact to be provided on the exterior surface of the telecommunications unit.

28 Claims, 6 Drawing Sheets

HANDLING TRANSFER OF MANAGEMENT DATA TO AND FROM A TELECOMMUNICATIONS UNIT OF A TELECOMMUNICATIONS SYSTEM

RELATED APPLICATIONS

This application is a continuation-in-part of U.S. patent application Ser. No. 10/993,858 filed 19 Nov. 2004, which application claims priority to GB0401278.7 filed 21 Jan. 2005. This application also claims priority to GB0401278.7 filed 21 Jan. 2005.

BACKGROUND OF THE INVENTION

1. Field of the Invention

The present invention relates to a telecommunications unit of a telecommunications system, and more particularly to techniques for interfacing with such a telecommunications unit to allow management data to be transferred to and from that telecommunications unit.

2. Description of the Prior Art

In accordance with a known wireless telecommunications system, a geographical area is divided into cells, each cell having one or more base stations, also referred to herein as central terminals (CTs), for communicating over wireless links with a number of subscriber terminals (STs) in the cell. These wireless links are established over predetermined frequency channels, a frequency channel typically consisting of one frequency for uplink signals from a subscriber terminal to the central terminal, and another frequency for downlink signals from the central terminal to the subscriber terminal.

The system finds a wide variety of possible applications, for example in rural, remote, or sparsely populated areas where the cost of laying permanent wire or optical networks would be too expensive, in heavily built-up areas where conventional wired systems are at full capacity or the cost of laying such systems would involve too much interruption to the existing infrastructure or be too expensive, and so on.

In one embodiment, the central terminal may be connected to a telephone network and exists to relay messages from subscriber terminals in the cell controlled by the central terminal to the telephone network, and vice versa. By this approach, an item of telecommunications equipment connected to a subscriber terminal may make an outgoing call to the telephone network, and may receive incoming calls from the telephone network.

However, such a wireless telecommunications system is not restricted to use with telephone signals, but could instead, or additionally, handle any other appropriate type of telecommunications signal, such as video signals, or data signals such as those used for transmitting data over the Internet, and in order to support new technologies such as Broadband and video-on-demand technologies.

Figure 1:
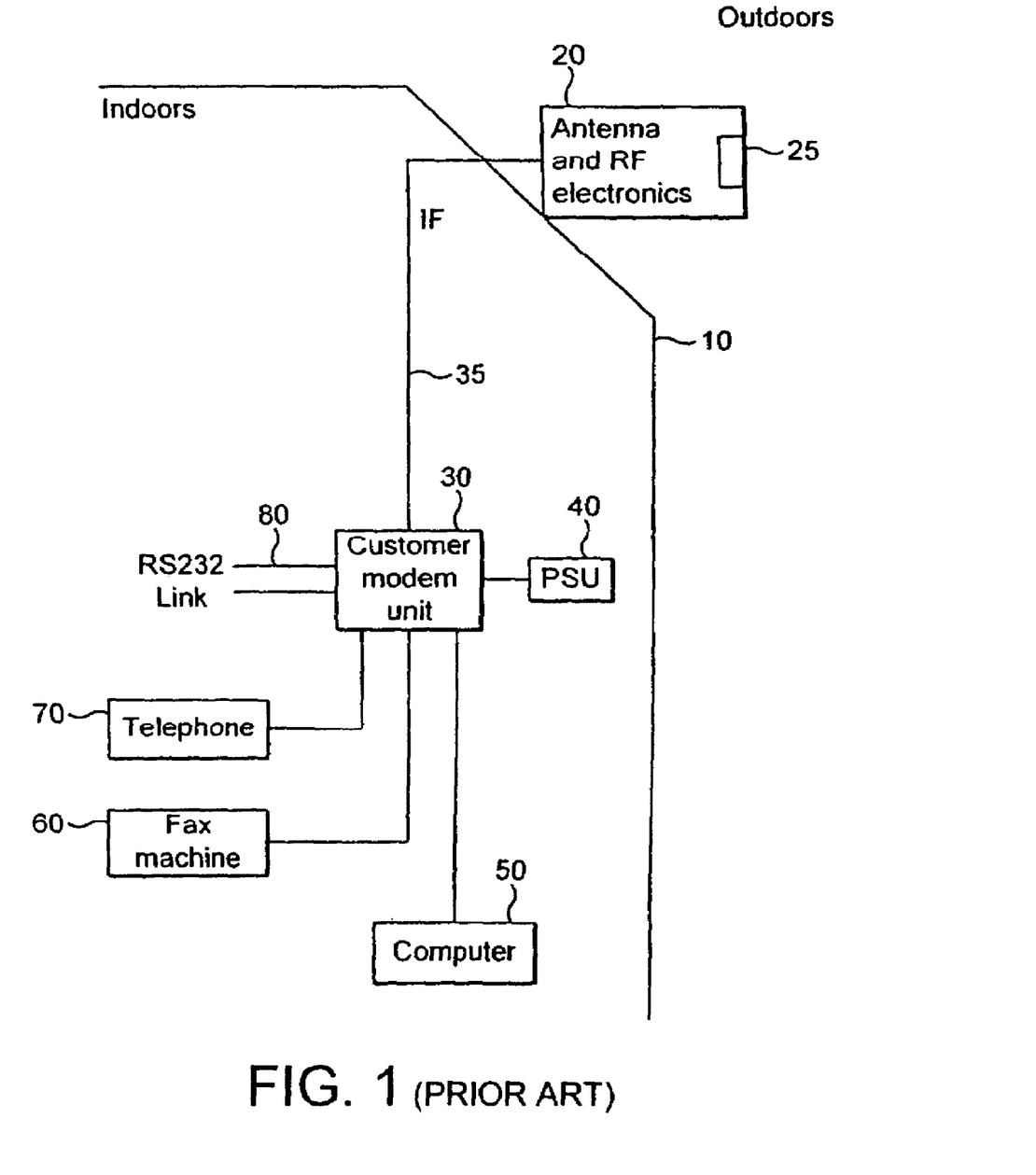
FIG. 1 is a block diagram schematically illustrating a known subscriber terminal.

FIG. 1 illustrates an example of a known configuration for a subscriber terminal for such a wireless telecommunications system. Some of the details of such a system are discussed in detail in UK Patent Application No. 9724612.8. In the embodiment illustrated in FIG. 1, the functionality of the subscriber terminal is split between outdoor and indoor units. Hence, an outdoor unit 20 containing an antenna and associated RF (radio frequency) electronics is mounted on the exterior of a subscriber's premises 10.

The RF electronics within the outdoor unit 20 are used to translate received downlink signals (i.e. signals received by the subscriber terminal from the base station) from the RF frequency to an intermediate frequency (IF) suitable for transmission to the customer modem unit 30 via the drop cable 35, and similarly to translate received signals from the customer modem unit 30 at an IF into an RF uplink signal (i.e. a signal for transmitting from the subscriber terminal to the base station) for transmission from the antenna provided within the outdoor unit 20.

The customer modem unit 30 may incorporate a "Code Division Multiplexed Access" (CDMA) modem operating at a fixed intermediate frequency, and also includes the electronics required to interface to the one or more items of telecommunications equipment (in this example a computer 50, fax machine 60 and telephone 70) connected to the subscriber terminal. The customer modem unit 30 is located within the subscriber's premises, for example close to the item(s) of telecommunications equipment. Further, the customer modem unit 30 is typically connected via a power cable to a power supply unit 40.

When installing such a subscriber terminal at a subscriber's premises 10, it is necessary for the antenna within the outdoor unit 20 to be aligned with the base station in order to optimise the signal strength for signals passed between the base station and the subscriber terminal. To enable this alignment process to be performed by a single installation engineer, it is known to provide an output pin 25 on the outdoor unit 20, which can be used to output a voltage indicative of received signal strength. The installation engineer can then connect a voltage meter to the pin 25, and monitor variations in the voltage as the antenna is moved. Typically, the antenna will be mounted in a fixed orientation within the outdoor unit, and hence typically the installation engineer will actually move the entire outdoor unit through a range of angles in order to determine the point at which the maximum voltage is output from the pin 25.

One problem with such an approach is that the resolution of the signal output from the pin 25 is relatively low, and hence this inhibits accurate alignment. Further, there is a delay between moving the antenna, and obtaining an output voltage from the pin indicative of the signal strength for the new alignment, due to the time taken to pass the received signal via the drop cable 35 to the customer modem unit 30, where the relevant processing takes place to determine the signal strength, and then outputting the signal strength indication back up the drop cable 35 for outputting from the pin 25 of the outdoor unit 20. Another problem that can occur is corrosion of the pin 25 due to exposure to the environment. Whilst when the outdoor unit is first installed this will not typically cause a problem, if there is any need subsequently to return and re-perform the alignment process, then any corrosion to the pin in the interim period can further degrade the signal output, and further inhibit accurate alignment.

As an alternative to the above approach of antenna alignment, it is also known to connect the customer modem unit 30 via an RS232 serial link 80 to a laptop computer running predetermined alignment software, and for an installation engineer to then move the antenna until an optimum alignment is detected. However, whilst this provides improved accuracy with regard to antenna alignment, it typically requires the presence of two installation engineers, one to move the antenna, and one to monitor the received signal strength on the laptop computer.

In addition to signal strength data required in order to correctly align the antenna, various other forms of management data sometimes need to be extracted from the subscriber terminal, or input to the subscriber terminal, for example to ensure the continued correct operation of the subscriber terminal. Hence, as an example, certain set-up data may need to be input to the subscriber terminal both at the time of installation, and subsequently, in order to correctly set up the logic within the subscriber terminal. Further, when faults are detected with the subscriber terminal, certain diagnostic data will typically need to be output from the subscriber terminal for analysis. Typically, such set-up data and diagnostic data is also retrieved from the subscriber terminal, and input to the subscriber terminal, via the RS232 serial link 80.

However, it will be appreciated that through this approach, it is necessary to gain access to the subscriber's premises 10 in order to perform such set-up and diagnostic activities. Nevertheless, due to the environmental concerns, and in particular corrosion and ingress of moisture, it has been considered impractical to provide a more complex connection block on the outdoor unit 20 in place of the simple pin 25 in order to support input and output of such management data. Hence, the contact pin 25 typically provides a simple, one-way communication path for a voltage to be output from the subscriber terminal.

Accordingly, it would be desirable to provide an improved technique for interfacing with a subscriber terminal in order to allow management data to be input to, and/or output from, the subscriber terminal. A subscriber terminal is just one example of a telecommunications unit with which such an interface technique would be desirable. It would hence be desirable to provide an interface technique which could also be used with other telecommunications units of the telecommunications system, for example a central terminal.

SUMMARY OF THE INVENTION

Viewed from a first aspect, the present invention provides a telecommunications unit for communicating over a wireless link with a further telecommunications unit of a telecommunications system in order to allow traffic data to be passed between the telecommunications unit and the further telecommunications unit, the telecommunications unit comprising: a management processor operable to handle management data; and inductive loop logic coupled to the management processor and operable to allow management data to be passed between the management processor and a portable management unit via a separate wireless link between the inductive loop logic and external inductive loop logic associated with the portable management unit.

In accordance with the present invention, the telecommunications unit is provided with a connectorless method for communication of management data between the telecommunications unit and the portable management unit. More particularly, the telecommunications unit has a management processor operable to handle management data, and inductive loop logic coupled to the management processor and operable to allow management data to be passed between the management processor and the portable management unit via a wireless link that is separate to the wireless link over which traffic data is communicated between the telecommunications unit and the further telecommunications unit. The inductive loop logic thus allows contactless communication between the telecommunications unit and the portable management unit.

The portable management unit may take a variety of forms, for example a small hand-held unit such as a meter device, a laptop computer, etc, and will have its own inductive loop logic associated therewith, either as an integral feature of the portable management unit, or as a separate unit connected to the portable management unit.

It has been found that the provision of such inductive loop logic within the telecommunications unit to allow management data to be passed between the management processor of the telecommunications unit and a portable management unit provides a cost effective mechanism for allowing a number of different types of management data to be communicated in a bidirectional manner between the telecommunications unit and the portable management unit. Further, since this approach is contactless, there is no need to provide connectors on an external surface of the telecommunications unit to allow the management data to be input to, and output from, the telecommunications unit, thus avoiding the potential problems of corrosion of such contacts, water ingress into the telecommunications unit, etc.

The telecommunications unit may take a variety of forms, and may in particular be any unit with which it is desired to exchange management data in a connectorless manner. In one embodiment, the telecommunications unit is a subscriber terminal and the further telecommunications unit is a base station, the subscriber terminal being operable to communicate over the wireless link with the base station in order to allow traffic data to be passed between the base station and an item of equipment connected to the subscriber terminal. In an alternative embodiment, the telecommunications unit is a base station and the further telecommunications unit is a subscriber terminal, the base station being operable to communicate over the wireless link with the subscriber terminal in order to allow traffic data to be passed between the base station and an item of equipment connected to the subscriber terminal.

It will be appreciated that the inductive loop logic can be incorporated within the telecommunications unit in a variety of different ways. However, in one embodiment, the telecommunications unit has a housing associated with a traffic data antenna used to communicate over the wireless link, and the inductive loop logic is provided within the housing. The housing may actually incorporate the traffic data antenna, or alternatively the traffic data antenna may be provided externally to the housing, but in that latter event the housing associated with the traffic data antenna will still typically be positioned in proximity to the traffic data antenna. Accordingly, it will typically be possible with such an arrangement for the same engineer to be able to manipulate the traffic data antenna whilst also being able to communicate management data between the telecommunications unit and the portable management unit via the inductive loop logic provided within the housing.

It will be appreciated that the housing can in theory be placed at any appropriate location. However, typically the housing is arranged to be mounted outdoors, for example on the exterior of a building, or on any suitable structure such as a pole or mast, as this is typically the best location for the traffic data antenna associated with the housing. Hence, in such embodiments, the housing will be exposed to the external environment, but since the inductive loop logic is provided within the housing, and no connectors need to be provided at the exterior surface of the housing to allow management data to be input and output, this approach avoids the need to compromise the integrity of the housing, and hence avoids the risk of moisture ingress and corrosion that would otherwise exist if a connector was provided for input and output of the management data.

It will be appreciated that the traffic data antenna can take a variety of forms. However, in one embodiment, the traffic data antenna is a flat panel antenna located within the housing. Typically, the housing will have a profile dictated by the flat panel antenna and accordingly will have a thin square or rectangular profile. With such a shape of housing, the earlier mentioned environmental issues of corrosion and moisture ingress are particularly pronounced, since connectors provided on the exterior surface of such flat panel antenna housings are typically more exposed than are connectors provided on other types of antennae. For example, with a dome-shaped antenna, it is often possible to shield connectors from the environment to some extent by placing the connectors in a sheltered location on the housing, for example the underside. Through the provision of the inductive loop logic within the housing in accordance with embodiments of the present invention, this enables the housing to be mounted in any appropriate orientation, for example a horizontal or vertical orientation, without risk of water ingress or corrosion, and accordingly provides much more flexibility with regard to the mounting of the flat panel antenna.

It will be appreciated that the management data can take a variety of forms. However, in one embodiment, the management processor is operable to derive as the management data signal strength data for signals received by the traffic data antenna, and to output that management data via the separate wireless link to the portable management unit, whereby the management data can be used during an alignment procedure of the traffic data antenna. Through such an approach, accurate alignment data can be provided to the portable management unit, and in embodiments where the output from the inductive loop logic can be received by a portable management unit held by the engineer aligning the antenna (for example because the inductive loop logic is provided in proximity to the traffic data antenna), this enables a single engineer to accurately align the traffic data antenna.

As an alternative to signal strength data, or in addition thereto, the management data may comprise set-up data passed between the management processor and the portable management unit via the separate wireless link. This set-up data may be bidirectional in nature. For example, in one embodiment, set-up data is input from the portable management unit to the telecommunications unit via the separate wireless link, and acknowledgement signals are returned via the separate wireless link to the portable management unit to confirm that the set-up data has been correctly received.

The set-up data may relate to the set-up of the management processor itself. Alternatively, or in addition, the set-up data may relate to other components within the telecommunications unit. For example, in one embodiment, the telecommunications unit further comprises one or more processing units operable to perform processing of the traffic data within the telecommunications unit, and the management processor is responsive to receipt of set-up data from the portable management unit to cause appropriate set-up control signals to be issued to the one or more processing units.

As an alternative to signal strength data and/or set-up data, or in addition thereto, the management data may take the form of diagnostic data. More particularly, in one embodiment, the telecommunications unit further comprises one or more processing units operable to perform processing of traffic data within the telecommunications unit, the management processor being operable to derive as the management data diagnostic data relating to operation of the one or more processing units or the management processor, and to output that management data via the separate wireless link to the portable management unit, whereby the management data can be used during a diagnostic procedure performed externally to the telecommunications unit.

It will be appreciated that the separate wireless link between the inductive loop logic of the telecommunications unit and the corresponding inductive loop logic within the portable management unit can be established in a variety of ways. However, typically the range of the separate wireless link will be relatively short. Accordingly, it will be desirable to provide a way of ensuring that a reliable wireless link between the two inductive loop logics can be formed. In one embodiment, the telecommunications unit further comprises a moulding provided on an external surface of the telecommunications unit in the vicinity of the inductive loop logic to define a receiving location for the external inductive loop logic associated with the portable management unit. By physically defining a receiving location for the external inductive loop logic on the external surface of the telecommunications unit (in one embodiment on the external surface of the housing associated with the traffic data antenna), a reliable contactless connection can be established. In one particular embodiment, the moulding defines not only a receiving location, but also a particular orientation for the external inductive loop logic, thereby ensuring correct placement of the external inductive loop logic relative to the inductive loop logic of the telecommunications unit.

It will be appreciated that the inductive loop logic can take a variety of forms. However, in one embodiment, the inductive loop logic comprises a transmission logic unit operable to modulate management data received from the management processor prior to output of the modulated management data to an inductive loop antenna provided within the telecommunications unit. This modulation can be achieved in a variety of ways. However, in one embodiment, the transmission logic unit comprises an On Off Keying (OOK) modulator with a preset modulation frequency. This provides a particularly cost effective and efficient approach for creating the required modulated management data for transmission from the telecommunications unit.

In one embodiment, the inductive loop logic comprises a reception logic unit operable to process management data received from the portable management unit via the separate wireless link prior to output of that management data to the management processor.

In one particular embodiment, the reception logic unit comprises detection logic operable to detect an analogue signal containing the management data, the analogue signal being received by an inductive loop antenna provided within the telecommunications unit, and conversion logic operable to convert the detected analogue signal into a digital signal prior to output to the management processor. Any management data received by the inductive loop logic of the telecommunications unit from the portable management unit will typically be in an analogue form, but typically the management processor will operate in the digital domain. Accordingly, the reception logic unit is arranged to detect the analogue signals received and convert them into appropriate digital signals for propagation on to the management processor.

Viewed from a second aspect, the present invention provides a method of interfacing with a telecommunications unit used to communicate over a wireless link with a further telecommunications unit of a telecommunications system in order to allow traffic data to be passed between the telecommunications unit and the further telecommunications unit, the telecommunications unit having a management processor operable to handle management data, the method comprising the steps of: (a) providing inductive loop logic within the telecommunications unit, the inductive loop logic being coupled to the management processor; (b) providing external inductive loop logic associated with a portable management unit; and (c) passing management data between the portable management unit and the management processor of the telecommunications unit via a separate wireless link between the inductive loop logic and the external inductive loop logic.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 2:
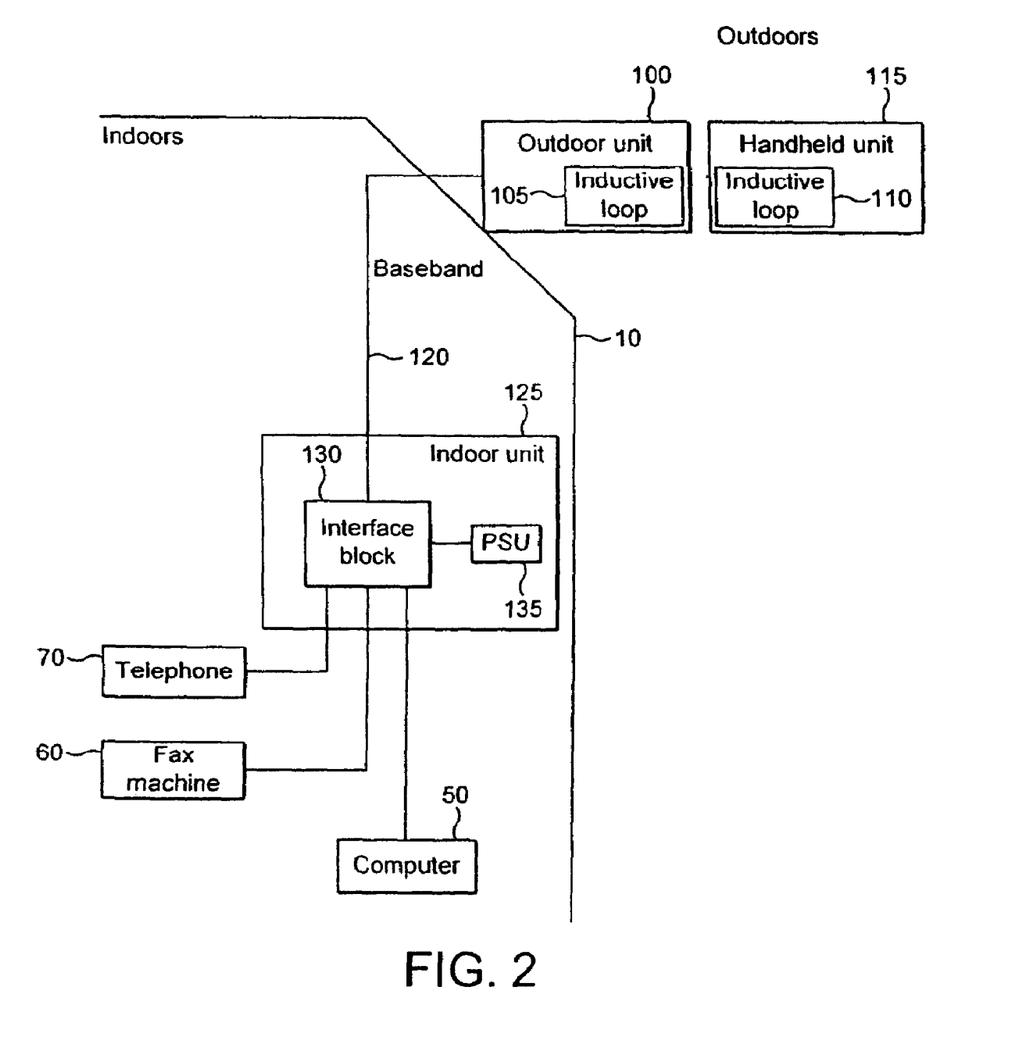
FIG. 2 is a block diagram schematically illustrating a subscriber terminal and hand-held unit in accordance with one embodiment of the present invention.

FIG. 2 is a block diagram illustrating a subscriber terminal in accordance with one embodiment of the present invention, and an associated hand-held unit which can send management data to, and receive management data from, the subscriber terminal. The subscriber terminal consists of two units, namely an outdoor unit 100 arranged to be mounted on the exterior of a subscriber's premises 10, and an indoor unit 125 to which one or more items of equipment may be connected. The indoor unit 125 and outdoor unit 100 are connected by a drop cable 120, which may for example be a four pair cat 5 cable. As will be discussed later with reference to FIGS. 3 to 5, the outdoor unit 100 of the embodiment of FIG. 2 contains the majority of the processing logic of the subscriber terminal, and the indoor unit 125 contains the interface logic required to enable traffic data to be routed to and from the appropriate connected item of telecommunications equipment.

In the example illustrated in FIG. 2, three items of equipment are connected to an interface block 130 within the indoor unit 125, namely a computer 50, a fax machine 60 and a telephone 70. However, it will be appreciated that any other appropriate type of telecommunications equipment could be connected to the indoor unit 125 dependent on the type of telecommunications signals being handled by the telecommunications system in which the subscriber terminal is provided. Such telecommunications signals may, for example, comprise a telephone signal, a video signal, or data signals such as those used for transmitting data over the Internet, and in order to support new technologies such as Broadband and video-on-demand technologies.

As illustrated in FIG. 2, the indoor unit 125 is also provided with a power supply unit 135, which in preferred embodiments provides power to the interface block 130 of the indoor unit 125, and also provides power via the drop cable 120 to the outdoor unit 100.

In accordance with this embodiment of the present invention, the outdoor unit 100 also contains inductive loop logic 105 which is able to transmit and receive certain management data via a separate wireless link distinct from the wireless link over which traffic data is passed between the subscriber terminal and the base station. In particular, the inductive loop logic 105 enables a short range wireless link to be established with corresponding inductive loop logic 110 provided within a hand-held unit 115. A hand-held unit 115 will be carried by an installation or maintenance engineer, and may take the form of some metering device, such as may be used for detecting received signal strength of signals received by the main antenna of the outdoor unit 100, or may take the form of some computing device, for example a laptop computer, which can be used to perform certain set-up and diagnostic functions with regard to the subscriber terminal. Whilst in FIG. 2 the inductive loop logic 110 is shown as being contained within the hand-held unit 115, it will be appreciated that in other embodiments the inductive loop logic 110 may be provided externally to the hand-held unit 115, and connected to the hand-held unit via an appropriate connection, for example a wired connection.

Figure 3:
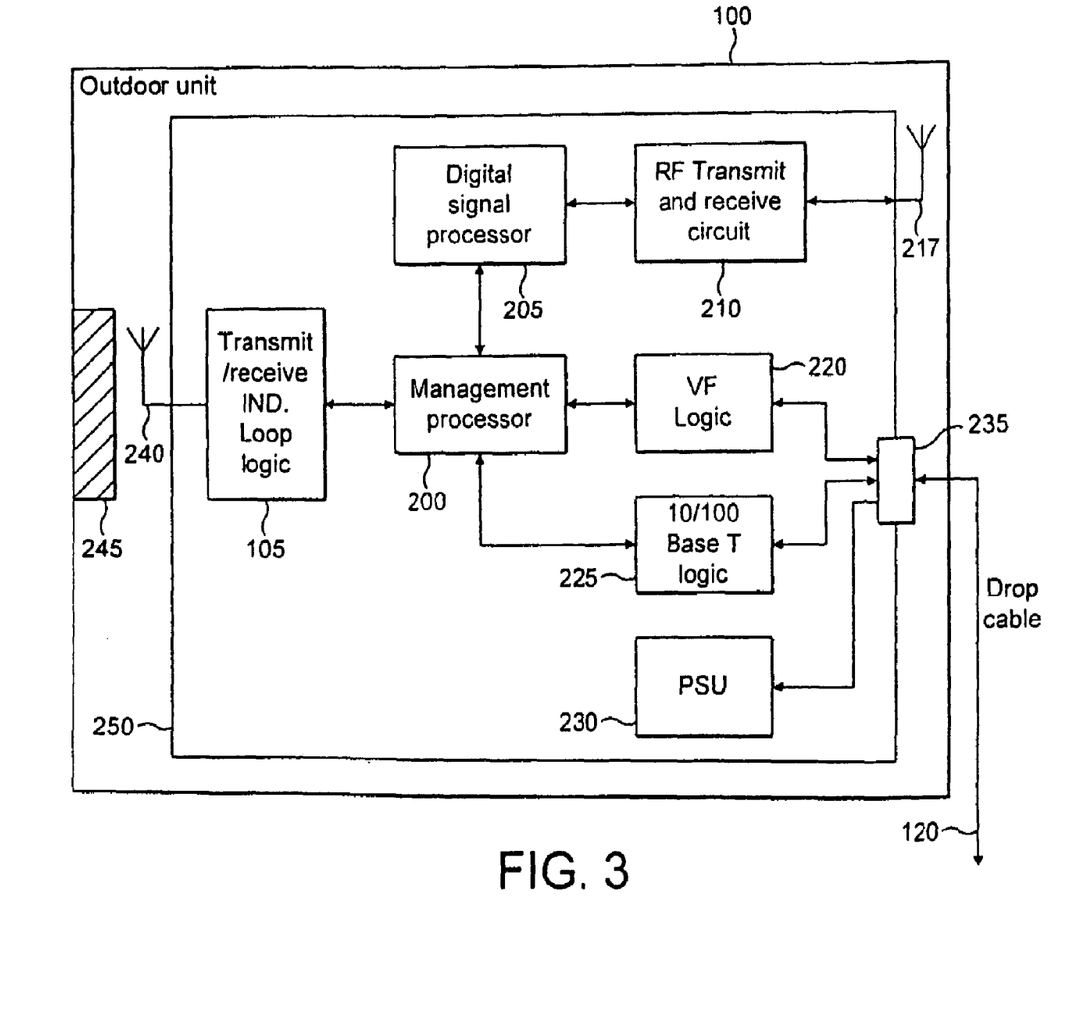
FIG. 3 is a block diagram illustrating components provided within the outdoor unit of FIG. 2.

FIG. 3 is a block diagram illustrating in more detail the components provided within the outdoor unit 100 in accordance with one embodiment. As can be seen from FIG. 3, the outdoor unit 100 contains a printed circuit board (PCB) 250 to which the main traffic data antenna 217 and an inductive loop antenna 240 are connected. Further, an interface 235 is provided to which the drop cable 120 can be connected.

The antenna 217 used to communicate with the base station of the telecommunications system is connected to RF transmit and receive circuit 210. As will be appreciated by those skilled in the art, the transmit circuitry within the RF transmit and receive circuit 210 is used to boost an analogue transmit signal prior to it being passed to the antenna 217, whilst the receive circuitry within the RF transmit and receive circuit 210 is used to demodulate a signal received by the antenna 217 prior to output of that signal to the digital signal processor 205.

The digital signal processor 205 includes an analogue to digital converter, and is arranged to process signals in the digital domain. More particularly, in one embodiment of the present invention, CDMA techniques are used to enable a plurality of separate communications to be simultaneously transmitted on the same frequency channel, and the digital signal processor 205 includes a CDMA modulator for modulating signals to be transmitted so as to form a composite signal for output into the RF transmit and receive circuit 210. Similarly, the DSP 205 includes a CDMA demodulator for demodulating a signal received from the RF transmit and receive circuit 210 so as to produce baseband signals representing the constituent communication signals contained within the received CDMA signal. The DSP also produces the necessary control signals to control the RF transmit and receive circuit 210.

Signals received by the antenna 217 and processed by the RF transmit and receive circuit 210 and the DSP 205 are passed to the management processor and associated logic 200 from where they are routed to either the voice frequency (VF) logic 220 or the 10/100 Base T logic 225 dependent on the form of the data received. In particular, any voice traffic is routed to the VF logic 220, which incorporates a Voice Codec and a ringer voltage generator, whilst Ethernet data traffic is routed to the 10/100 Base T logic 225 which incorporates an Ethernet transceiver. Similarly, any voice or data traffic generated by the items of equipment connected to the indoor unit 125 and passed over the drop cable 120 to the outdoor unit 100 will be routed via the appropriate VF logic 220 or the 10/100 Base T logic 225 and on to the management processor and associated logic 200. The management processor will then route the signals to the DSP 205 from where they can be processed for transmission through the RF transmit and receive circuit 210 and the antenna 217.

The management processor 200 additionally performs certain management tasks, such as the collection of diagnostic data, the management and routing of set-up data to the relevant components of the subscriber terminal, the collection of signal strength data, etc. These various different items of management data can be routed to the transmit/receive inductive loop logic 105 which is coupled to an inductive loop antenna 240.

Provided within the outer housing of the outdoor unit 100 is a moulding 245 which is shaped so as to receive the inductive loop logic 110 of the hand-held unit 115. In addition to defining a receiving location for that inductive loop logic 110, the moulding 245 can also be shaped so as to specify a particular orientation of that inductive loop logic 110. Through the provision of such a moulding 245, the inductive loop antenna of the inductive loop logic 110 can be placed in proximity to the inductive loop antenna 240 provided within the outdoor unit 100, so as to allow a reliable wireless connection to be established.

Through such a mechanism, the hand-held unit 115 can input set-up data into the outdoor unit 100, from where it will be received by the management processor 200 from the transmit/receive inductive loop logic 105. This set-up data can be used to control the set-up of the management processor 200 itself, or the set-up of other components within the subscriber terminal, for example the components of the outdoor unit 100 illustrated in FIG. 3. The management processor 200 can then be arranged to issue acknowledgement signals back to the hand-held unit 115 via the inductive loop logic 105 and the inductive loop antenna 240.

Similarly, diagnostic data collected by the management processor 200 can be output to the hand-held unit 115 via the inductive loop logic 105 and the inductive loop antenna 240. This then enables certain diagnostic programs to be run on the hand-held unit 115 in order to determine faults within the subscriber terminal.

Furthermore, during installation of the subscriber terminal, alignment of the antenna 217 of the outdoor unit can be controlled by arranging the management processor to output signal strength data to the hand-held unit via the inductive loop logic 105 and the inductive loop antenna 240, so as to allow that received signal strength information to be monitored by the installation engineer with reference to the hand-held unit.

As shown in FIG. 3, the outdoor unit 100 contains a power supply unit 230 which is provided with a power supply via the drop cable 120, the power supply being routed to the power supply unit 230 via the drop cable from the power supply unit 135 within the indoor unit 125. This will be discussed in more detail later with reference to FIG. 5.

Figure 4:
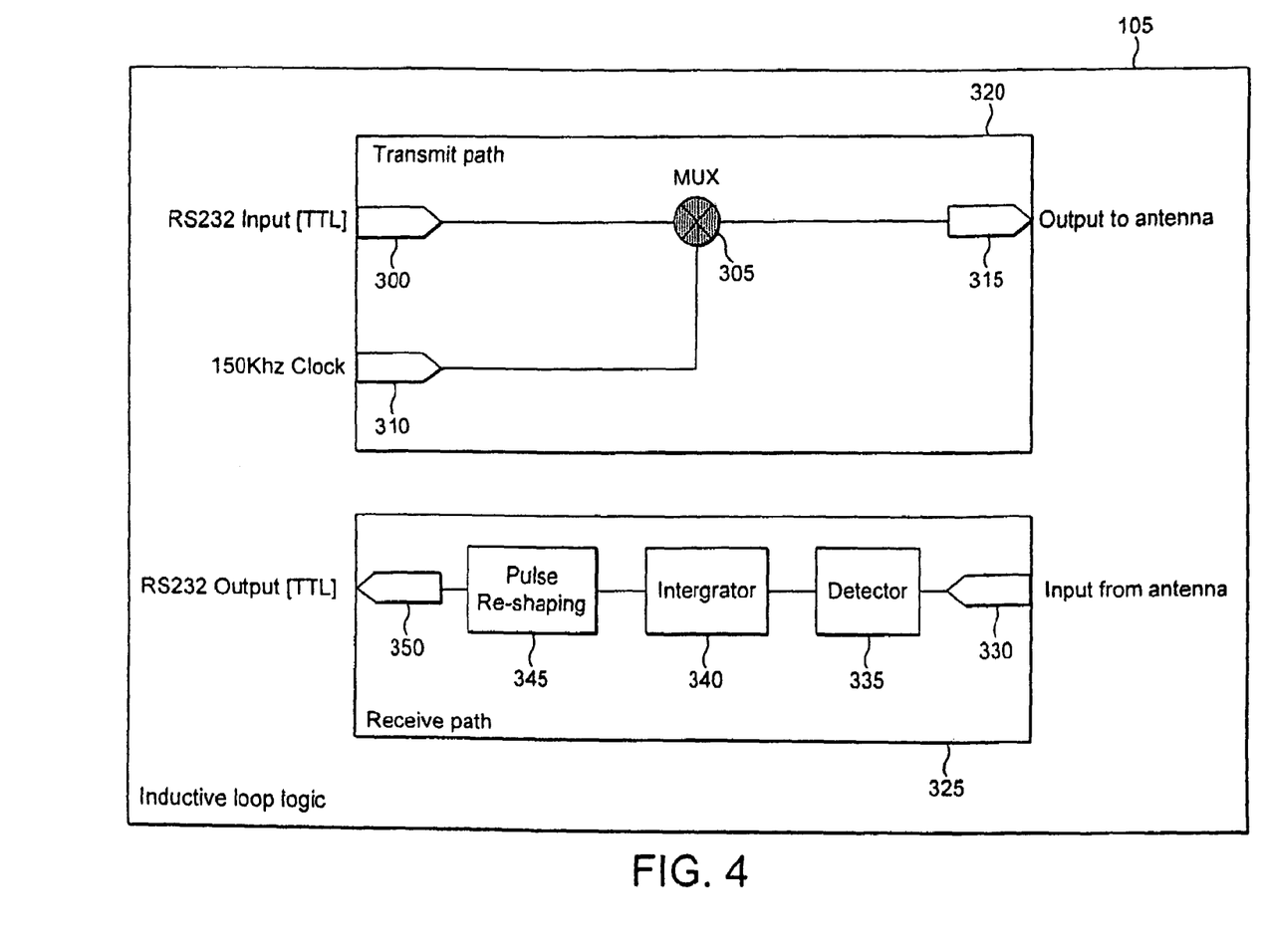
FIG. 4 is a diagram illustrating the logic provided within the inductive loop logic of FIG. 3.

FIG. 4 is a block diagram illustrating in more detail the transmit and receive paths within the inductive loop logic 105 of FIG. 3. The transmit path 320 is arranged to receive from the management processor 200 management data at an input 300. This data is then routed via a multiplexer 305, which is also arranged to receive via input 310 a clock signal. In the particular embodiment illustrated in FIG. 4, this clock signal has a frequency of 150 Khz. Accordingly, the multiplexer 305 modulates the management data using the modulation frequency set by the clock input 310. The resultant modulated management data is then passed via output 315 to the inductive loop antenna 240. The transmit path 320 of FIG. 4 hence performs the function of a simple On Off Keying (OOK) modulator.

Turning now to the receive path 325, this consists of three blocks, namely a detector 335, an integrator 340 and a pulse reshaper 345. Data received by the inductive loop antenna 240 is passed to the input 330 of the receive path 325, from where it is routed to the detector 335. The detector of one embodiment is a high gain zero crossing detector, which is arranged such that each time a 150 Khz signal is detected, a pulse is generated at the output of the detector. The integrator 340 then examines the output of the detector 335 and outputs a DC value. If the DC value exceeds a preset value, the pulse re-shaping logic 345 is arranged to generate a valid TTL (Transistor Transistor Logic) pulse at the output 350.

Figure 5:
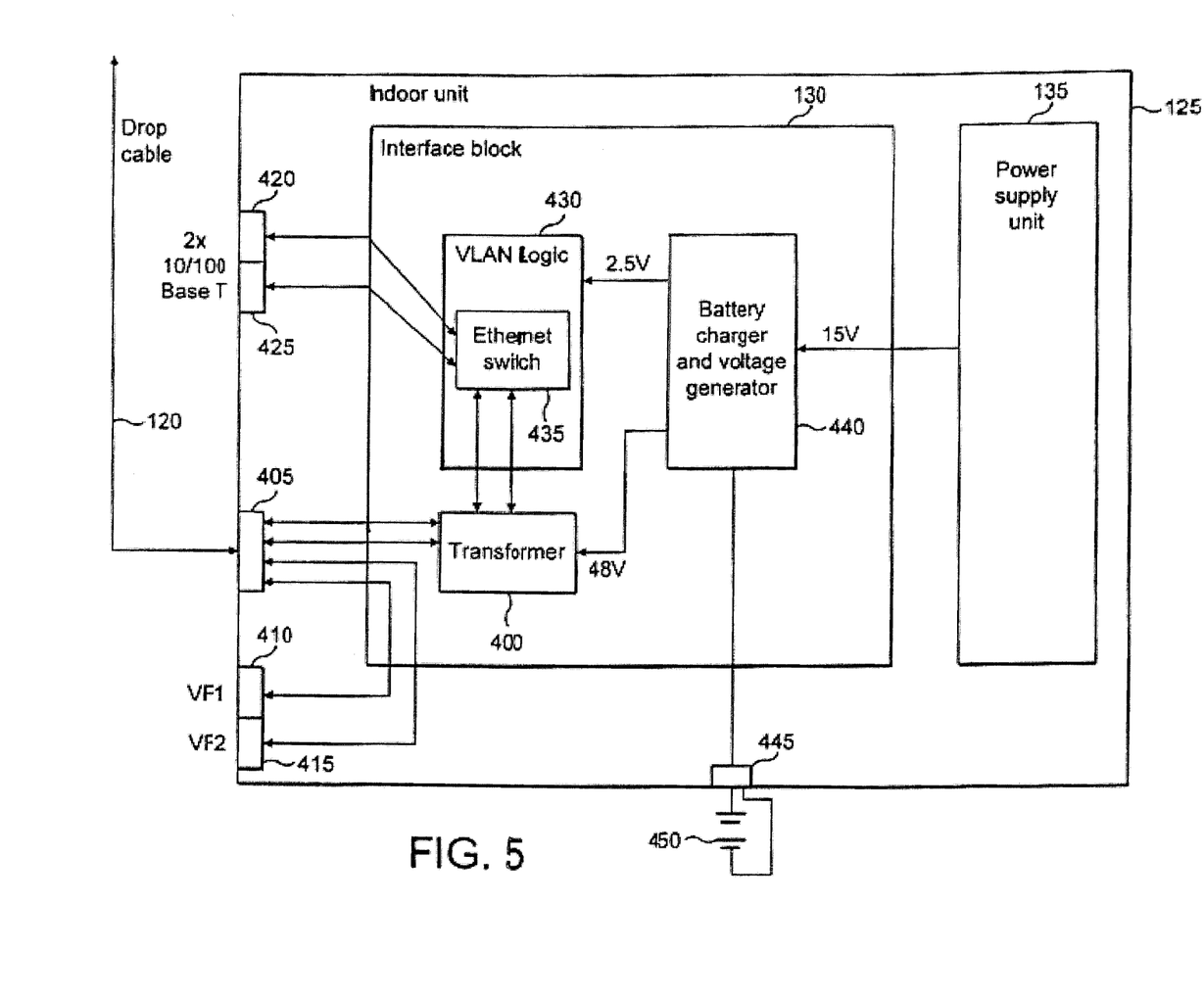
FIG. 5 is a block diagram illustrating components provided within the indoor unit of FIG. 2.

FIG. 5 is a block diagram illustrating in more detail the construction of the indoor unit 125 in accordance with one embodiment. As mentioned earlier, the indoor unit 25 contains an interface block 130 and a power supply unit 135. An interface 405 is provided for connection to the drop cable 120, in preferred embodiments the drop cable 120 comprising a four pair cat 5 cable.

The power supply unit 135 is arranged to output a 15 volt supply to the battery charger and voltage generator 440. A signal output by the battery charger and voltage generator 440 is sent to the connector 445, to which a rechargeable battery 450 can be connected. This will ensure that in the event of a mains power failure, the subscriber terminal can still be used.

The battery charger and voltage generator 440 is arranged to generate a 2.5 volt supply for the VLAN logic 430 within the interface block 130, and is also arranged to generate a 48 volt supply which is provided to the transformer 400.

Two of the four pairs of the cables within the drop cable 120 are in one embodiment used to carry voice frequency signals, and these two pairs are coupled via the connector 405 to the voice frequency ports 410 and 415. This allows two items of telecommunications equipment to be connected to voice frequency channels, and hence in this example two telephone lines can be supported from the subscriber terminal. The other two pairs of the drop cable are used to carry Ethernet traffic, and these two cables are routed via the transformer 400 to an Ethernet switch 435 within the VLAN logic 430. Information within the data packets of the Ethernet data will identify to which of the two Ethernet ports 420, 425 each Ethernet data packet should be routed, and the Ethernet switch 435 is accordingly arranged to route data between the relevant Ethernet port 420, 425 and the appropriate pair of wires within the drop cable 120.

In accordance with one embodiment of the present invention, both of the pairs of the cable used to carry Ethernet traffic are also used to carry a power supply to the power supply unit 230 within the outdoor unit 100, and this is the reason that the two pairs of wires containing Ethernet traffic are routed via the transformer 400. In particular the transformer 400 is arranged to take the 48 volt supply provided by the battery charger and voltage generator 440, and to modulate that voltage on to two of the pairs of wires of the drop cable for routing via the drop cable to the PSU 230 within the outdoor unit 100. The PSU 230 can then from that 48 volt supply produce the necessary voltage supplies for the components within the outdoor unit 100.

In one particular embodiment, one of the pairs of wires used for Ethernet traffic is used for Ethernet data to be transmitted from the subscriber terminal, whilst the other pair of wires dedicated to Ethernet traffic is used to carry Ethernet data received by the subscriber terminal. In this particular embodiment, the pairs of wires used for Ethernet traffic are used for carrying the 48 volt supply from the indoor unit 125 to the outdoor unit 100.

From the above description of an embodiment of the present invention, it can be seen that through the use of inductive loop logic within the outdoor unit 100, an efficient technique is provided for the communication of management data between the subscriber terminal and a hand-held unit 115 belonging to an engineer. In particular, signal strength data required for alignment of the main traffic data antenna can be output via the inductive loop logic of the subscriber terminal to the hand-held unit 115, and additionally diagnostic data can also be output through this mechanism to the hand-held unit for use in diagnostic processes. Further, set-up data can be routed from the hand-held unit to the subscriber terminal using this mechanism. In one particular embodiment, this wireless link via an inductive loop enables RS232 serial link data to be communicated between the subscriber terminal and the hand-held unit via a contactless connection. This can provide a bidirectional link, for example with rates up to 9600 baud.

By providing a contactless mechanism for the communication of such management data, the integrity of the enclosure of the outdoor unit 100 can be maintained, alleviating the risk of moisture ingress into the subscriber terminal, corrosion, etc. For some antenna designs, this also improves the flexibility of mounting, since with prior art designs where pins are provided on the external surface of the antenna housing, mounting configurations have been restricted to those that reduce the exposure of these external pins to the environment. In one particular embodiment, the outdoor unit 100 includes a flat panel antenna, and through the use of the inductive loop logic 105, avoiding the need for external pins, a great deal of flexibility is provided for horizontal and vertical antenna mounting.

It will be appreciated that in addition to the management data specifically described in the description of the above embodiment, other forms of management data can also be provided, for example software updates for the software running on components within the subscriber terminal may be provided via such a wireless link from the hand-held unit 115 to the subscriber terminal.

Figure 6:
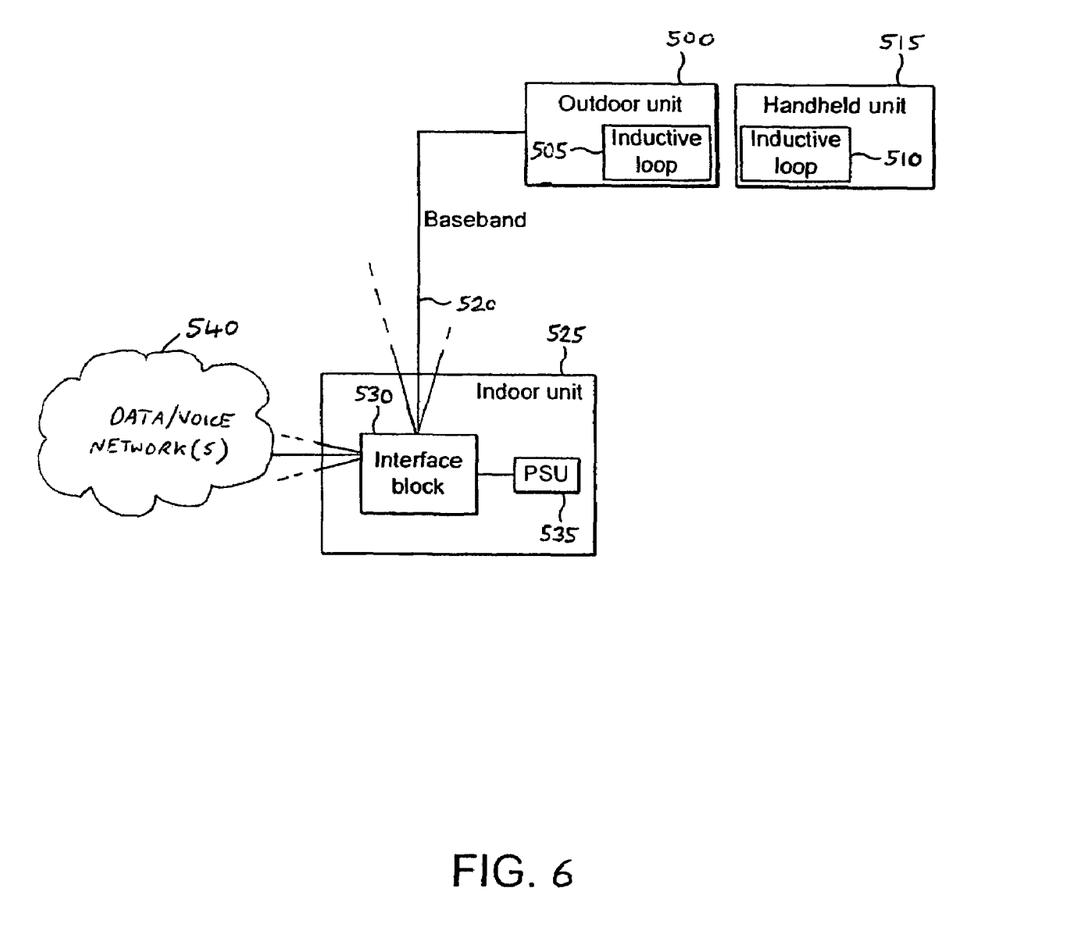
FIG. 6 is a block diagram illustrating a base station and hand-held unit in accordance with one embodiment of the present invention.

FIG. 6 is a block diagram illustrating a base station in accordance with another embodiment of the present invention, and an associated hand-held unit which can send management data to, and receive management data from, the base station. The base station consists of two units. The first unit is an outdoor unit 500 arranged to be mounted either on the exterior of a building, or on any suitable structure such as a pole or mast, such that the base station can provide radio coverage for the target subscriber terminals. The second unit is an indoor unit 525, which can also be mounted outside provided that a suitable weatherproof housing is provided. The indoor unit 525 and outdoor unit 500 are connected by a drop cable 520, which may for example be a four pair cat 5 cable.

The indoor unit 525 provides the interconnection between one or many outdoor units 500 and one or many telecommunications voice/data networks 540. As in previous embodiments, such telecommunications signals may, for example, comprise a telephone signal, a video signal, or data signals such as those used for transmitting data over the Internet, and in order to support new technologies such as Broadband and video-on-demand technologies.

As illustrated in FIG. 6, the indoor unit 525 is also provided with a power supply unit 535, which in preferred embodiments provides power to the interface block 530 of the indoor unit 525, and also provides power via the drop cable 520 to the outdoor unit(s) 500.

In accordance with this embodiment of the present invention, the outdoor unit 500 also contains inductive loop logic 505 which is able to transmit and receive certain management data via a separate wireless link distinct from the wireless link over which traffic data is passed between the base station and associated subscriber terminals. In particular, the inductive loop logic 505 enables a short range wireless link to be established with corresponding inductive loop logic 510 provided within a hand-held unit 515. A hand-held unit 515 will be carried by an installation or maintenance engineer, and may take the form of some metering device, such as may be used for indicating the transmitted or received signal strength at the outdoor unit 500, or may take the form of some computing device, for example a laptop computer, which can be used to perform certain set-up and diagnostic functions with regard to the base station.

Whilst in FIG. 6 the inductive loop logic 510 is shown as being contained within the hand-held unit 515, it will be appreciated that in other embodiments the inductive loop logic 510 may be provided externally to the hand-held unit 515, and connected to the hand-held unit via an appropriate connection, for example a wired connection.

The use of an inductive loop interface with a base station could be particularly beneficial for optimisation of alignment of the outdoor unit, either in a point-to-multipoint wireless network, or in point-to-point operation (for example for backhaul applications). Non-intrusive configuration and enabling installation by a single person are additional benefits of this embodiment.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A telecommunications unit for communicating over a wireless link with a further telecommunications unit of a telecommunications system in order to allow traffic data to be passed between the telecommunications unit and the further telecommunications unit, the telecommunications unit comprising:
   a management processor operable to handle management data;
   inductive loop logic coupled to the management processor and operable to allow management data to be passed between the management processor and a portable management unit via a separate wireless link between the inductive loop logic and external inductive loop logic associated with the portable management unit;
   the telecommunications unit having an outdoor unit arranged to be mounted outdoors and associated with a traffic data antenna used to communicate over the wireless link; and
   the management processor and the inductive loop logic being provided within the outdoor unit.

2. A telecommunications unit as claimed in claim 1, wherein the telecommunications unit is a subscriber terminal and the further telecommunications unit is a base station, the subscriber terminal being operable to communicate over the wireless link with the base station in order to allow traffic data to be passed between the base station and an item of equipment connected to the subscriber terminal.

3. A telecommunications unit as claimed in claim 1, wherein the telecommunications unit is a base station and the further telecommunications unit is a subscriber terminal, the base station being operable to communicate over the wireless link with the subscriber terminal in order to allow traffic data to be passed between the base station and an item of equipment connected to the subscriber terminal.

4. A telecommunications unit as claimed in claim 1, wherein the traffic data antenna is a flat panel antenna located within the outdoor unit.

5. A telecommunications unit as claimed in claim 1, wherein the management processor is operable to derive as the management data signal strength data for signals received by the traffic data antenna, and to output that management data via the separate wireless link to the portable management unit, whereby the management data can be used during an alignment procedure of the traffic data antenna.

6. A telecommunications unit as claimed in claim 1, wherein the management data comprises set-up data passed between the management processor and the portable management unit via the separate wireless link.

7. A telecommunications unit as claimed in claim 6, further comprising one or more processing units operable to perform processing of the traffic data within the telecommunications unit, and wherein the management processor is responsive to receipt of set-up data from the portable management unit to cause appropriate set-up control signals to be issued to the one or more processing units.

8. A telecommunications unit as claimed in claim 1, further comprising one or more processing units operable to perform processing of traffic data within the telecommunications unit, the management processor being operable to derive as the management data diagnostic data relating to operation of the one or more processing units or the management processor, and to output that management data via the separate wireless link to the portable management unit, whereby the management data can be used during a diagnostic procedure performed externally to the telecommunications unit.

9. A telecommunications unit as claimed in claim 1, further comprising a moulding provided on an external surface of a housing of the outdoor unit in the vicinity of the inductive loop logic to define a receiving location for the external inductive loop logic associated with the portable management unit.

10. A telecommunications unit as claimed in claim 1, wherein the inductive loop logic comprises:
a transmission logic unit operable to modulate management data received from the management processor prior to output of the modulated management data to an inductive loop antenna provided within the telecommunications unit.

11. A telecommunications unit as claimed in claim 10, wherein the transmission logic unit comprises an On Off Keying (OOK) modulator with a preset modulation frequency.

12. A telecommunications unit as claimed in claim 1, wherein the inductive loop logic comprises:
a reception logic unit operable to process management data received from the portable management unit via the separate wireless link prior to output of that management data to the management processor.

13. A telecommunications unit as claimed in claim 12, wherein the reception logic unit comprises:
detection logic operable to detect an analogue signal containing the management data, the analogue signal being received by an inductive loop antenna provided within the telecommunications unit; and
conversion logic operable to convert the detected analogue signal into a digital signal prior to output to the management processor.

14. A method of interfacing with a telecommunications unit used to communicate over a wireless link with a further telecommunications unit of a telecommunications system in order to allow traffic data to be passed between the telecommunications unit and the further telecommunications unit, the telecommunications unit having a management processor operable to handle management data, the method comprising the steps of:
(a) placing the management processor within an outdoor unit arranged to be mounted outdoors and associated with a traffic data antenna used to communicate over the wireless link;
(b) providing inductive loop logic within the outdoor unit, the inductive loop logic being coupled to the management processor;
(c) providing external inductive loop logic associated with a portable management unit; and
(d) passing management data between the portable management unit and the management processor of the telecommunications unit via a separate wireless link between the inductive loop logic and the external inductive loop logic.

15. A method as claimed in claim 14, wherein the telecommunications unit is a subscriber terminal and the farther telecommunications unit is a base station, the subscriber terminal communicating over the wireless link with the base station in order to allow traffic data to be passed between the base station and an item of equipment connected to the subscriber terminal.

16. A method as claimed in claim 14, wherein the telecommunications unit is a base station and the farther telecommunications unit is a subscriber terminal, the base station being operable to communicate over the wireless link with the subscriber terminal in order to allow traffic data to be passed between the base station and an item of equipment connected to the subscriber terminal.

17. A method as claimed in claim 14, wherein the traffic data antenna is a flat panel antenna located within the outdoor unit.

18. A method as claimed in claim 14, further comprising the steps of:
deriving as the management data signal strength data for signals received by the traffic data antenna; and
at said step (d), outputting that management data from the management processor via the separate wireless link to the portable management unit, whereby the management data can be used during an alignment procedure of the traffic data antenna.

19. A method as claimed in claim 14, wherein the management data comprises set-up data passed between the management processor and the portable management unit via the separate wireless link.

20. A method as claimed in claim 19, wherein the telecommunications unit further comprises one or more processing units operable to perform processing of the traffic data within the telecommunications unit, the method further comprising the step of:
responsive to receipt by the management processor of set-up data from the portable management unit, issuing appropriate set-up control signals to the one or more processing units.

21. A method as claimed in claim 14, wherein the telecommunications unit further comprises one or more processing units operable to perform processing of traffic data within the telecommunications unit, the method further comprising the steps of:
deriving as the management data diagnostic data relating to operation of the one or more processing units or the management processor; and
at said step (d), outputting that management data from the management processor via the separate wireless link to the portable management unit, whereby the management data can be used during a diagnostic procedure performed externally to the telecommunications unit.

22. A method as claimed in claim 14, further comprising the step of:
placing the external inductive loop logic associated with the portable management unit in a receiving location defined by a moulding provided on a external surface of a housing of the outdoor unit in the vicinity of the inductive loop logic.

23. A method as claimed in claim 14, further comprising the step of:
for management data to be issued from the management processor to the portable management unit, modulating within the inductive loop logic management data received from the management processor prior to output of the modulated data to an inductive loop antenna provided within the telecommunications unit.

24. A method as claimed in claim 23, wherein said modulating step is performed by an On Off Keying (OOK) modulator with a preset modulation frequency.

25. A method as claimed in claim 14, further comprising the step of:
for management data to be received by the management processor from the portable management unit, processing within the inductive loop logic management data received from the portable management unit via the separate wireless link prior to output of that management data to the management processor.

26. A method as claimed in claim 25, wherein said processing step comprises the steps of:
detecting an analogue signal containing the management data, the analogue signal being received by an inductive loop antenna provided within the telecommunications unit; and
converting the detected analogue signal prior to output to the management processor.

27. A telecommunications unit for communicating over a wireless link a further telecommunications unit of a telecommunications system in order to allow traffic data to be passed between the telecommunications unit and the further telecommunications unit, the telecommunications unit comprising:
a management processor operable to handle management data;
inductive loop logic coupled to the management processor and operable to allow management data to be passed between the management processor and a portable management unit via a separate wireless link between the inductive loop logic and external inductive loop logic associated with the portable management unit;
the inductive loop logic comprising a reception logic unit operable to process management data received from the portable management unit via the separate wireless link prior to output of that management data to the management processor; and
the reception logic unit comprising:
detection logic operable to detect an analogue signal containing the management data, the analogue signal being received by an inductive loop antenna provided within the telecommunications unit; and
conversion logic operable to convert the detected analogue signal into a digital signal prior to output to the management processor.

28. A method of interfacing with a telecommunications unit used to communicate over a wireless link with a further telecommunications unit of a telecommunications system in order to allow traffic data to be passed between the telecommunications unit and the further telecommunications unit, the telecommunications unit having a management processor operable to handle management data, the method comprising the steps of:
(a) providing inductive loop logic within the telecommunications unit, the inductive loop logic being coupled to the management processor;
(b) providing external inductive loop logic associated with a portable management unit; and
(c) passing management data between the portable management unit and the management processor of the telecommunications unit via a separate wireless link between the inductive loop logic and the external inductive loop logic;
(d) for management data to be received by the management processor from the portable management unit, processing within the inductive loop logic management data received from the portable management unit via the separate wireless link prior to output of that management data to the management processor;
said processing step comprising the steps of:
(e) detecting an analogue signal containing the management data, the analogue signal being received by an inductive loop antenna provided within the telecommunications unit; and
(f) converting the detected analogue signal into a digital signal prior to output to the management processor.

* * * * *

UNITED STATES PATENT AND TRADEMARK OFFICE
CERTIFICATE OF CORRECTION

PATENT NO. : 7,440,727 B2
APPLICATION NO. : 11/039353
DATED : October 21, 2008
INVENTOR(S) : Nicolas J. Forbes et al.

It is certified that error appears in the above-identified patent and that said Letters Patent is hereby corrected as shown below:

In claim 22, column 15, line 7, before the word "external" delete the word "a" and insert the word -- an --.

In claim 23, column 15, line 16, before the word "data" insert the word -- management --.

In claim 26, column 15, line 35, after the word "signal" insert the phrase -- into a digital signal --.

In claim 27, column 15, line 38, after the word "link" insert the word -- with --.

Signed and Sealed this

Third Day of November, 2009

David J. Kappos
*Director of the United States Patent and Trademark Office*